3,255,139
PREPARATION OF N - (ALKENYLOXYMETHYL-ENE) ACRYLAMIDE COPOLYMERS AND PRODUCTS THEREOF
Karl Dinges, Cologne-Stammheim, and Erwin Müller, Leverkusen, Germany, assignors to Farbenfabriken Bayer Aktiengesellschaft, Leverkusen, Germany, a German corporation
No Drawing. Filed Mar. 21, 1962, Ser. No. 187,449
17 Claims. (Cl. 260—29.6)

The present invention relates to polymers and copolymers containing methylol ether groups and a process for production of said polymers.

The production of polymers and copolymers of polymerisable organic compounds which contain the grouping I. 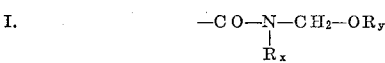

and wherein $R_x$ represents hydrogen or alkyl and $R_y$ represents alkyl (i.e., a saturated aliphatic hydrocarbon radical), is already known. As compounds of the said type, there are more especially described acrylic and methacrylic methylol alkyl ethers, such as for example the methyl or ethyl ethers. Using this process, it is possible to produce polymers containing unbranched methylol alkyl ether groups, which polymers can be cross-linked in a second stage by the action of hydrolysing agents, such as acids, at elevated temperature. This cross-linking takes place in the presence of hydrolysable agents, advantageously above 100° C., whereas cross-linking temperatures up to 150° C. are necessary in the absence of hydrolysing agents such as acids. The products thus obtained are synthetic resins or elastomers, which are suitable for various purposes of use in the plastics art.

The process according to the present invention consists in the production of homopolymers and copolymers of methylol alkenyl ethers of polymerisable organic acid amides, i.e., compounds which contain in addition to at least one polymerisable carbon to carbon double bond, the grouping II. 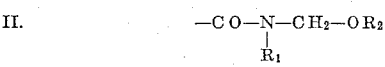

in which the radical $R_1$ represents a hydrogen atom, a saturated monovalent aliphatic hydrocarbon radical with 1–5 carbon atoms, preferably a methyl or ethyl radical, and $R_2$ represents an alkenyl radical (i.e., monoolefinically unsaturated aliphatic radical) having up to 6 carbon atoms, advantageously a radical containing 3 carbon atoms. The grouping represented by the foregoing formula and hereinafter referred to as an alkenyl methylol ether grouping, should be present at least once in the molecule to be polymerised.

Compounds of this type can be polymerised as such or admixed with one or more organic compounds which contain at least one polymerisable carbon to carbon double bond, in block, solution or emulsion, to form compounds of high molecular weight containing methylol alkenyl ether groups. These compounds can be cross-linked at elevated temperature or with hydrolysing agents, more especially acids or poly-functional compounds which are able to react with the methylol ether groups or their cleavage products which form under the action of hydrolysing agents.

As typical examples of these methylol alkenyl ethers there are to be mentioned N-(allyloxymethylene)-acrylamide and -methylacrylamide, which can be obtained from the corresponding methylol compounds by etherification with allyl alcohol in acid medium.

III. 

IV. 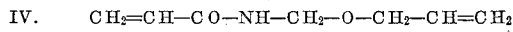

Furthermore compounds as for example

N-(allyloxymethylene)-N-methyl-methacrylamide,
N-(allyloxymethylene)-N-ethyl-methacrylamide,
N-(allyloxymethylene)-N-propyl-methacrylamide,
N-(allyloxymethylene)-N-methyl-acrylamide,
N-(allyloxymethylene)-N-ethyl-acrylamide,
N-(allyloxymethylene)-N-propyl-acrylamide.

It is surprising that such compounds which contain two carbon-to-carbon double bonds can be transformed into unbranched polymers or copolymers by the fact that under the conditions of the present procedure only the double bond juxtaposed to the carbonyl group polymerises. The thus formed polymer is a thermoplastic product of high molecular weight which can be stored without any modification at room temperature, in aqueous solution or aqueous emulsion, while still containing reactive methylol alkenyl ether groupings which are available for further cross-linking and polymerisation reactions.

In accordance with the present process, both homopolymers and copolymers can be prepared with the use of the aforementioned special monomers. Copolymers can contain any desired proportions of the components to be used according to the invention, i.e., from about 0.5–99 mol percent (calculated on the total amount of monomers), but contents of 1–15 mol percent are of particular interest.

Suitable as copolymerisable monomers for the production of copolymers by the present process are the various types of organic compounds with one or more polymerisable carbon-carbon-double bonds, advantageously those with one or two conjugated double bonds.

To be mentioned are: polymerisable organic compounds having a terminal $CH_2=CH-$ group, as for example: acrylic or methacrylic acid as well as their esters with saturated monohydric aliphatic alcohol or methacrylic acid amide, acrylonitrile and methacrylonitrile, aromatic monovinyl compounds, i.e., styrenes which are halogenated or alkylated on the nucleus or side chains, such as α-methyl styrene, vinyl toluene and chlorostyrene, styrene derivatives, vinyl halides such as vinyl chloride, vinylidene chloride, vinyl esters such as vinyl acetate, vinyl propionate, vinyl butyrate, and vinyl ketones and vinyl ethers, such as methyl vinyl ether. Furthermore of a preferred interest are open chain aliphatic conjugated diolefines with 4–6 carbon atoms, such as butadiene, chloroprene, isoprene and 2,3-dimethylbutadiene.

Furthermore, monomers with a cross-linking action and containing at least two non-conjugated (isolated) carbon-carbon double bonds can also be used as copolymerisation compounds in quantites of about 0.01 to 10% by weight, based on the weight of the total monomers, such as for example glycol diacrylates, glycol dimethacrylates, allyl acrylate and/or methacrylate, divinylbenzene or substitution products of the said compounds.

It is obviously possible that other unsaturated polymerisable compounds with self cross-linking groups can also be used as copolymerisation component. Mentioned as examples of suitable copolymerisable components of this nature which permit the introduction of self cross-linking groupings are the methylol ethers of acrylic or methacrylic acid amides of the following general Formula V. 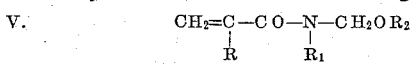

in which R stands for hydrogen or methyl, $R_1$ for hydrogen, alkyl, aralkyl or aryl, $R_2$ for alkyl or cycloalkyl, such as for example methyl, ethyl, n-propyl, isopropyl, n-butyl, isobutyl, cyclohexyl (see German Patent 1,035,363 and Belgian Patent 539,963 as well as copending U.S. Patent 2,978,432).

In similar manner, Mannich bases of acrylic and methacrylic acid amide can be used, which are represented by the following general Formula VI VI.
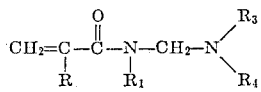

in which R and $R_1$ have the same meaning as in Formula V and $R_3$ and $R_4$ stand for alkyl, cycloalkyl, aralkyl or jointly for a heterocyclic radical, such as for example the morpholine radical (see German Patent 1,102,404 and Belgian Patent 584,600 as well as copending U.S. patent application Serial No. 851,971 and now abandoned).

On the other hand it is possible within the scope of the present invention to subject to the copolymerisation with the monomers to be employed in accordance with the present process, those monomers which correspond to the general Formula VII VII.
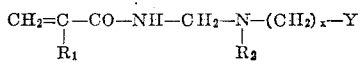

in which:

$R_1$ can represent hydrogen, alkyl groups and cycloalkyl groups with advantageously 1–6 carbon atoms, aralkyl groups, or aryl groups, $R_2$ can represent hydrogen, alkyl groups and cycloalkyl groups with advantageously 1–6 carbon atoms, aralkyl groups, aryl groups and also groups of the general composition $-(CH_2)_x-Y$, $x$ can represent an integer from 1–20 and preferably from 2–4, Y can represent $-SO_3H$, $-COOH$, $-OH$, $-CN$, $-CH=CH_2$, $-SO_3Me$, $-COOMe$

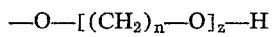

wherein $z$ is an integer from 1–25, $n$ an integer from 1–4, and Me is an alkali metal or ammonium (see Belgian Patent 596,034 as well as copending U.S. patent application Serial No. 61,829 and now Patent No. 3,178,385).

It is also possible to employ as a copolymerisation component olefinically unsaturated monomers with hydrophilic groups, more especially with carboxyl groups, hydroxyl groups, and carboxylic acid amide groupings, such as for example $\alpha,\beta$-unsaturated carboxylic acids, such as acrylic acid, methacrylic acid and maleic acid or their semi-esters and the like (see in this connection Belgian Patent 591,126).

The choice of the monomers depends on the desired properties of the copolymers. It is advisable to combine one or more monomers having an elasticising action and one or more monomers having a reinforcing action (i.e., in the sense of increasing the hardness of the polymers) with a monomer being capable of subsequent cross-linking and to subject this mixture to copolymerisation.

As monomers having an elasticising action in accordance with the foregoing invention, there are to be mentioned conjugated diolefines, esters of acrylic acid with more than 2 carbon atoms in the ester grouping and also esters of methacrylic acid with more than 4 carbon atoms in the ester grouping; the proportion of the elasticising monomers should advantageously represent 40–70% of the proportion of the total monomer components.

Styrene as well as substituted styrenes, on the one hand, and acrylonitrile and methacrylonitrile on the other hand, are understood as monomers with a reinforcing action within the scope of the present invention and are usually employed in amounts of from 5–30 percent of the proportion of the total monomer components.

Monomers being capable of cross-linking under action of heat or acidic substances in general are on the one hand the methylol alkenyl ethers according to the present invention (Formula II). On the other hand there may be present as additional monomers being capable of cross-linking the aforementioned olefinically unsaturated methylol ethers and also the olefinically unsaturated Mannich bases as well as the compounds corresponding to Formula VII, although it is obvious that the combination of other monomers with a cross-linking action is not to be excluded. The last-mentioned compounds are advantageously used in quantities of 1–10%, calculated on the total quantity of monomers.

The methylol alkenyl ethers to be used according to the invention can be polymerised by themselves or in admixture with other polymerisable compounds, both by block polymerisation or solution polymerisation, but advantageously in aqueous solution or in emulsion, depending on the nature of the monomers to be used. The temperatures to be maintained are generally preferably between 0 and 70° C. and advantageously between 40 and 60° C.

As activating agents for initiating the polymerisation, it is possible to use known radical formers such as inorganic per compounds, for example, ammonium or alkali metal persulphates, such as potassium persulphate, as well as hydrogen peroxide, and also alkali metal or ammonium perborates, percarbonates and perphosphates.

On the other hand, organic peroxy compounds, such as diacyl peroxides, for example benzoyl peroxide, dichlorobenzoyl peroxide, and also alkyl hydroperoxides such as di-tert.-butylhydroperoxide, cumene hydroperoxide, p-methanehydroperoxide and the like can also be used.

Furthermore, as catalyst, it is possible to use nitrogen-containing compounds which have a tendency to radical decomposition, i.e., more especially organic azo compounds, in which the azo group is acyclic and in which both nitrogen atoms are connected to carbon atoms, which have aliphatic properties and of which at least one is a tertiary carbon atom. Catalysts of this type are for example azo diisobutyric acid dinitrile and dimethyl azoisobutyrate.

Especially in the case of emulsion polymerisation, it is advisable to work with redox systems in order to keep the polymerisation temperatures low. Advantageously to be considered as oxidising agents for this purpose are inorganic persulphates such as ammonium or alkali metal persulphates, as already mentioned above. Sulphur compounds of the lower valency stages of sulphur are advantageously to be considered as reducing agents when working in acid medium, such as alkali metal or ammonium pyrosulphite, alkali metal or ammonium bisulphite, alkali metal thiosulphates.

There are also to be considered alkali metal formaldehyde sulphoxylates, formamidine-sulphinic acid as well as reducing agents, which are only effective in alkali medium, such as triethanolamine, diethylene triamine, triethylenetetramine. It is of course possible to use these redox systems in the presence of complex formers, such as pyrophosphates, or those of the ethylenediamine tetraacetic acid type, or in combination with heavy metal salts, such as those of iron or copper.

The quantities of catalysts to be used are preferably between 0.01 and 5%, advantageously 0.1 and 3%.

The molecular weight and the length of the polymer chains can be influenced in the present process by adding known agents for regulating the molecular weight, and examples of these are: Long-chain mercaptans, i.e., containing an aliphatically saturated alkyl radical with 8–18 and preferably 12–16 carbon atoms, such as, for example, n- or tert.-dodecyl mercaptans or mixtures thereof, mixed tert. $C_{12}$–$C_{16}$ mercaptans and also diisopropyl-xanthogen disulphide (see Zeitschrift für makromolekulare Chemie, 3, page 53 (1949)). By suitable variation of the quantity and the individual regulators, it is possible for the polymers to be substantially adapted in their thermoplastic behaviour to the actual purpose of use.

The regulators referred to above are preferably used in quantities of 0.05 to 3% by weight, calculated on the total weight of monomers.

The pH value to be maintained when preparing the copolymers can fluctuate within wide limits, preferably between pH 3 to pH 9, and where re-emulsifiable latices are produced, a pH value between 4 and 7 has proved desirable. It was extremely surprising that no cross-linking occurred during the polymerisation while maintaining these polymerisation conditions.

The various types of emulsifiers can be used with the homopolymerisation or copolymerisation according to the invention, i.e., both ionic emulsifiers, cationic emulsifiers and also non-ionic emulsifiers.

The following are to be mentioned as emulsifiers of the anionic type which can be used for the present process: Alkali metal or ammonium salts of long-chain monocarboxylic acids, more especially aliphatic saturated monocarboxylic acids with 10–12 carbon atoms, fatty acids, resinic acids, as well as semi-esters of saturated or unsaturated dicarboxylic acids with long-chain monohydric alcohols, salts of acid alkyl-sulphuric acid esters, more especially with an alkyl radical containing 10 to 20 carbon atoms, i.e., fatty alcohol sulphates such as sodium-lauryl sulphate, salts of long-chain alkyl-sulphonic acids, more especially with 10–15 carbon atoms, salts of alkyl aryl-sulphonic acids, such as sodium-dodecyl benzene sulphonate, diisopropyl naphthalene sulphonates or potassium-isopropyl benzene sulphonate, salts of sulphonated oils, for example sulphonated castor oil, alkali metal salts of sulphodicarboxylic acids and their esters of the ROOC—CH(SO$_3$Me)—CH$_2$—COOR type, i.e., sulphosuccinates such as sodium octyl sulphosuccinate, sulphophthalic acid esters, salts of fatty acid condensation products with hydroxy alkyl carboxylic acids, aminoalkyl carboxylic acids, hydroxyalkyl sulphonic acids, aminoalkyl sulphonic acids, salts of hydroxy fatty alkyl sulphonic acids, and salts of sulphonated ethylene oxide adducts, for example, of the R—C$_6$H$_4$—O—(CH$_2$CH$_2$O)$_x$—SO$_3$Me or R—O—(CH$_2$OH$_2$O)$_x$SO$_3$Me type, wherein R represents an alkyl radical and $x$ an integer from 1–10.

The following are to be mentioned as examples of cationic emulsifiers: Salts of alkylamines, aryl-, alkylaryl- or resin amines, more especially amines which contain a long-chain alkyl radical carrying for example 10–20 carbon atoms and inorganic or organic acids such as dodecylamine hydrochloride or acetate, stearylamine hydrochloride or acetate, and salts of quaternary ammonium compounds with a long-chain alkyl radical comprising for example 10–20 carbon atoms.

Suitable non-ionic emulsifiers are the following: Alkyl-phenoxy-polyethoxyethanols with alkyl groups of about 7 to 18 carbon atoms and 6 to 60 or more oxyethylene units, such as heptyl-phenoxy-polyethoxyethanols, octyl-phenoxy-polyethoxyethanols, methyl-octyl-phenoxy-polyethoxy-ethanols, nonyl-phenoxy-polyethoxyethanols, dodecylphenoxy-polyethoxyethanols and the like: Polyethoxyethanol derivatives of alkyl phenols carrying methylene groups; sulfur-containing compounds, such as those obtained by condensation of 6–60 or more mols of ethylene oxide with nonyl, dodecyl, tetradecyl and similar mercaptans or with alkyl thiophenols with alkyl groups of 6–15 carbon atoms; ethylene oxide derivatives of long-chain carboxylic acids, such as lauric, myristic, palmitic, and oleic acid and the like with 6 to 60 ethylene oxide units per molecule; ethylene oxide condensation products of long-chain alcohols such as octyl, decyl, lauryl or cetyl alcohol; ethylene oxide derivatives of etherified or esterified polyhydroxy compounds which contain a hydrophobic hydrocarbon chain, such as sorbitol monostearate with 6 to 60 oxyethylene units, etc.; and also ethylene oxide condensates with long-chain or branched amines, such as dodecylamines, hexadecylamines and octadecylamines, which contain 6 to 60 oxyethylene groups.

The following are preferred: reaction products of ethylene oxide (5–50 mols) with phenols (1 mol), for example ethoxylated nonyl phenols, ethoxylated oxydiphenyl, advantageously those with more than 10 ethylene oxide units; reaction products of alkylene oxide with fatty alcohols, for example ethoxylated decyl alcohol, ethoxylated oleyl alcohol and the like.

The aforementioned emulsifiers of non-ionic character can be used in quantities of 1 to 10% by weight and preferably 2 to 6% by weight, based on the weight of the total monomers. For preparation purposes, ion-active emulsifiers, especially anion-active emulsifiers, can also be used in addition to the said non-ion-active emulsifiers, but the quantity of these ion-active emulsifiers should in general not be more than 0.5%, calculated on the weight of the monomers being used.

Re-emulsifiable latices are obtained by the monomers referred to being copolymerised in aqueous dispersion with the use of emulsifiers of non-ionic character, advantageously at a pH value below 6 and a temperature below 50° C., with olefinic monomers having hydrophilic groups and by the dispersions which are obtained being adjusted to pH values of about 6.5–9. As monomers, it is possible here to use those olefinically unsaturated compounds into which hydrophilic groups are introduced, for example by saponification, only after the copolymerisation.

Suitable olefinic monomers with hydrophilic groups are for example, $\alpha,\beta$-olefinically unsaturated carboxylic acids, more especially monocarboxylic or dicarboxylic acids, such as acrylic acid, methacrylic acid, maleic acid, semi-esters of maleic acid with saturated aliphatic or cycloaliphatic alcohols, and also monoesters of $\alpha,\beta$-unsaturated monocarboxylic acids with polyhydric alcohols, such as glycol, diethylene glycol, trimethylol propane, and glycerine. Vinyl esters, more especially vinyl acetate and propionate, as well as maleic anhydride, are mentioned as olefinically unsaturated compounds which contain hydrophilic groups after the saponification. Of the said monomers, acrylic acid has proved to be especially suitable.

This group of copolymerisable monomers can advantageously be used in quantities from 1 to 20% by weight, based on the total proportion of monomers.

The cross-linking of the polymers or copolymers obtained by the process according to the invention can be initiated by purely thermal treatment of the polymers by way of a polymerisation of the allyl groupings. In contrast to the polymers containing alkyl methylol ethers, the cross-linking reactions of the alkenyl methylol ethers take place under considerably more gentle conditions. Although a thermal cross-linking can be carried out at temperatures up to about 150°, it is also possible to achieve a purely thermal cross-linking of the emulsions, which can be stored without any modification at room temperature, with evaporation of the emulsion on the water bath. A preferred range of temperature for thermal cross-linking is between 90 and 120° C. An extensive cross-linking can finally also be observed at room temperature with suitably long storage times, for example 10 to 20 hours.

The cross-linking of the polymers is effected under even more gentle conditions in the presence of acids, and this is to be attributed to the fact that the allyl ethers can be split off more readily than the alkyl ethers. It is possible to operate in such a way that the aqueous solutions or emulsions of these polymers are adjusted by means of suitable acid or acidly acting compounds, such as hydrochloric, sulphuric, phosphoric, oxalic, acetic or trichloroacetic acids, ammonium chloride or phosphates, to a pH value of advantageously 2-5, applying these solutions or dispersions to suitable supports and then evaporating the solvent at elevated temperatures until the cross-linking of the polymers takes place.

Another variant as regards the cross-linking of the polymers to be used according to the invention consists in storing these products at room temperature in an atmosphere containing acid vapours.

The initial monomers with alkenyl methylol ether groupings to be used for the present process can be prepared by the corresponding methylol compounds of the associated acid amides, i.e., of acrylamide or methacrylamide, being first of all prepared in the presence of small quantities of polymerisation inhibitors, such as hydroquinone, phenthiazine or copper, by condensation of these amides with the formaldehyde or substances yielding formaldehyde, more especially paraformaldehyde. In this case, advantageously equimolar quantities up to approximately a single molar excess of formaldehyde are used and the condensation is carried out in solvents, such as benzine, carbontetrachloride or the like in the presence of catalytic quantities of alkali alcoholates, for example sodium methylate (pH value about 8 to 10) at temperatures of about 40 to 50° C. The methylol compound separated out is thereafter suspended in an excess of allyl alcohol, preferably in the ratio of about 1:5, and the etherification is effected by introducing gaseous hydrochloric acid at approximately 30 to 50° C. After about 20 to 30 minutes, the substance is neutralised with alkali carbonate or bicarbonate, filtered and the excess allyl alcohol distilled off in vacuo. In this way, there is obtained the allyl ether of N-methylol methacrylamide with the boiling point of 110 to 112° C./0.5 mm. Hg, or the allyl ether of N-methylolacrylamide with the boiling point of 105 to 107° C./0.5 mm. Hg, in yields of about 70 to 75% of the theoretical.

The allyl ethers of N-methylolamides of unsaturated carboxylic acids to be used as initial monomers can of course also be obtained by trans-etherification processes.

Because of their property of already changing under gentle conditions into insoluble cross-linking products, the polymers and copolymers obtainable according to the invention can be used for the production of any desired moulded elements, impregnations, coatings and adhesive connections. The possibility of carrying out the cross-linking reaction under exceptionally mild conditions in particular permits such cross-linking reactions of more especially temperature-sensitive support materials. Particular possibilities of using the present invention are thus in the field of textile printing, leather dressing and paper coating.

The parts indicated in the following examples are parts by weight, unless otherwise indicated.

*Example 1*

18 parts of a sodium salt of a long-chain paraffin-sulphonic acid and 6 parts of a polyethoxylated fatty alcohol (100%) are dissolved in 450 parts of salt-free water and adjusted with 0.2 part of sodium hydroxide to a pH value of 7.6. 180 parts of butylacrylate, 108 parts of styrene and 12 parts of N-(allyloxymethylene)-methacrylamide.

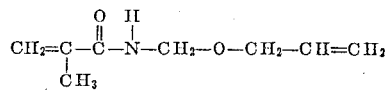

are mixed and added to the aqueous phase while stirring.

Polymerisation takes place at 45° C. by adding 0.18 part of potassium persulphate and 0.10 part of triethanolamine. After 5-6 hours, a stable latex is obtained in which 95-97% of the monomers used are polymerised.

If the polymer is precipitated from this dispersion with methanol and briefly dried between filter papers, the plastic can be easily dissolved in solvents such as dimethylformamide.

When this plastic dispersion is applied to and dried on suitable supports, clear transparent films are formed which become completely insoluble in acetone, chloroform or dimethylformamide after 10-15 hours, even at room temperature.

If the plastic dispersion is adjusted prior to the drying to a pH value between 2 and 5 or if the application and drying is carried out in an acid atmosphere, the cross-linking is already effected in a substantially shorter time at room temperature.

*Example 2*

24 parts of a reaction product of a long-chain alcohol ($C_{12}$-$C_{14}$) with 440-616 parts of ethylene oxide and 1.5 parts of a formaldehyde-naphthaline-sulphonic acid condensation product are dissolved in 600 parts of salt-free water. After adding 1.2 parts of potassium persulphate, 18 parts of sodium pyrosulphite and adjusting a pH value of 4.5, the monomer mixture comprising 200 parts of butyl acrylate, 100 parts of styrene, 80 parts of acrylonitrile and 20 parts of N-(allyloxymethylene)-methacrylamide is added to the prepared aqueous phase. The polymerisation is already completed after about 5 hours at 40° C. and 96% of the monomers used are polymerised.

The stable latex which forms, after being dried, can be easily redispersed again with water to form a plastic emulsion. If the dried-on latex film is however left standing for about 5 hours at room temperature, this property has completely disappeared and the now cross-linked plastic film can also no longer be dissolved in solvents such as dimethylformamide.

*Example 3*

A solution of 180 parts of the reaction product of 1 mol of cetyl alcohol and 15 to 20 mols of ethylene oxide, 30 parts of a condensation product of formaldehyde and naphthalene sulphonic acid, 50 parts of 46% acrylic acid and 3850 parts of water are placed in a 10-litre stirrer-type autoclave with a stainless steel lining. A mixture of 1350 parts of butadiene, 450 parts of butyl acrylate, 35 parts of acrylonitrile, 90 parts of N-(allyloxymethylene)-acrylamide and 6 parts of tert.-dodecyl mercaptan is emulsified into this solution. After heating to 35° C., 20 parts of sodium pyrosulphite and 20 parts of potassium persulphate, each dissolved in 200 cubic metres of water, are added. At approximately 33% and 60% conversion, 40 parts of 46% acrylic acid in 100 parts of water are added on each occasion. The polymerisation is terminated after 25 hours.

The substantially 37-38% latex has an excellent mechanical stability. The plastic films produced therewith on suitable supports can be cross-linked by leaving for a relatively long time at room temperature or by heating for a brief period to 130° C. and are thus made insoluble in all solvents.

*Example 4*

20 parts of acrylamide and 20 parts of N-(allyloxymethylene)-methacrylamide are dissolved in 360 parts of salt-free water. After displacing the air by nitrogen, the temperature is raised to 60° C. and activation is effected with 0.008 part of sodium salt of ethylene diamine tetraacetic acid and 0.004 part of $FeSO_4 \cdot 7H_2O$. Upon adding 0.70 part of potassium persulphate, the polymerisation commences and this is terminated after 5-6 hours with a yield of 96-97%.

The coatings and impregnations on suitable supports, prepared with this 10% aqueous plastic solution, can already be made insoluble in a short time, even at room temperature, by adding small quantities of acid substances.

Example 5

A solution of 500 parts of water, 30 parts of a reaction product of 15–20 mols of ethylene oxide and 1 mol of o-oxydiphenylmethane and 5 parts of a formaldehyde-napthalene sulphonic acid condensation product is placed in a stirrer-type vessel. A mixture of 300 parts of butyl acrylate, 45 parts of ethylacrylate, 100 parts of acrylonitrile, 25 parts of styrene, 12 parts of methacrylamide methylol allyl ether and 0.25 part of n-dodecylmercaptan as well as 32.5 parts of 47% acrylic acid in 200 parts of water is polymerised in the said vessel. The substantially 37–38% dispersion which is obtained produces clear films of drying, and these films can thereafter be redispersed again with water. After being stored for a few hours at room temperature, a cross-linking occurs and thus the films become completely insoluble in the conventional solvents, such as acetone, chloroform and dimethyl formamide.

The polymeric materials obtained by polymerisation of the methylol alkenyl ethers according to the present invention represent uncross-linked materials containing as characteristics structural element side chains of the general formula

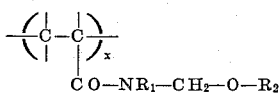

$$\mathrm{CO-NR_1-CH_2-O-R_2}$$

wherein $R_1$ and $R_2$ have the same significance as in Formula II. These uncross-linked materials may be cross-linked under action of heat or acidic substances as described in detail above.

What we claim is:

1. A process for the preparation of a novel linear copolymer of an amide derivative of the formula:

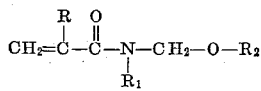

wherein R is a member selected from the group consisting of hydrogen and methyl, $R_1$ is a member selected from the group consisting of hydrogen and an aliphatic saturated hydrocarbon radical of 1–5 carbon atoms, and $R_2$ is an alkenyl radical having 2–6 carbon atoms which comprises copolymerizing said monomers with 0.5–99 mole percent, based on the total weight of monomers, of at least one comonomer having at least one polymerizable carbon-to-carbon double bond, said copolymerization being conducted in the presence of from 0.01 to 5% by weight, based on the total weight of monomers of a free radical-forming catalyst at a temperature of from 0°–70° C. and at a pH of between 3 and 9.

2. The process of claim 1 wherein said comonomer contains a terminal $CH_2=C<$ group.

3. The process of claim 1 wherein said comonomer is an aliphatic conjugated diolefin of 4–6 carbon atoms.

4. The process of claim 1 wherein said comonomer is one which imparts to the linear copolymer the ability to self-cross-link, said comonomer containing at least two non-conjugated carbon-to-carbon double bonds, and it is incorporated into said copolymer in an amount of 0.01–10% by weight, based on the total weight of monomers.

5. The process of claim 1 wherein said amide derivative is copolymerized with a mixture of (a) a monomer having an elasticizing action, said monomer being selected from the group consisting of an aliphatic conjugated diolefin having 4–6 carbon atoms, an ester of acrylic acid having at least two carbon atoms in the ester grouping, and an ester of methacrylic acid having at least 4 carbon atoms in the ester grouping, said elasticizing monomer being applied in an amount of from 40–70% by weight, based on the total amount of monomers, and (b) a monomer having a reinforcing action, said monomer being selected from the group consisting of styrene, substituted styrenes, acrylonitrile and methacrylonitrile, said reinforcing monomer being applied in an amount of from 5–30% by weight of the total amounts of monomers.

6. The process of claim 1 wherein the copolymerization of monomers is carried out in aqueous emulsion at a pH value below 6 and using emulsifiers of non-ionic character.

7. The process of claim 6 wherein in addition anion-active emulsifiers are used in amounts not exceeding 0.5% by weight, based on the total weight of monomers.

8. The process of claim 1 wherein said copolymerization is conducted in aqueous emulsion to form a latex of the copolymer.

9. A cross-linked copolymer prepared by adjusting the pH of the latex prepared according to claim 8 to a pH of 2–5 and drying said polymer.

10. A linear copolymer prepared by copolymerizing (1) an amide derivative of the formula:

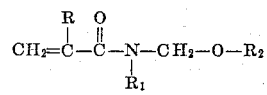

wherein R is a member selected from the group consisting of hydrogen and methyl, $R_1$ is a member selected from the group consisting of hydrogen and an aliphatic saturated hydrocarbon radical of 1–5 carbon atoms, and $R_2$ is an alkenyl radical having 2–6 carbon atoms, with (2) 0.5–99 mole percent of a comonomer having at least one polymerizable carbon-to-carbon double bond, said copolymerization being conducted in the presence of from 0.01 to 5% by weight, based on the total weight of monomers of a free radical-forming catalyst at a temperature of from 0°–70° C. and at a pH of between 3 and 9.

11. A process for the preparation of a clear transparent resinous film which comprises applying to a support a stable latex of a linear copolymer of butyl acrylate, styrene and from 1–15 mole percent, based on the total weight of monomers, of a compound of the formula:

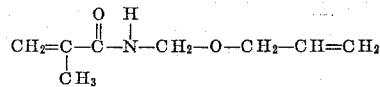

said monomers having been copolymerized in the presence of from 0.01 to 5% by weight, based on the total weight of monomers, of a free radical forming catalyst at a temperature from 0° to 70° C. and at a pH of between 3 and 9 and said latex having a substantially neutral pH, and permitting the latex film to stand for a time sufficient to form a cross-linked film on the support.

12. The process of claim 6 wherein the cross-linking of the copolymer on said support is accelerated by lowering the pH of the latex to a value between 2 and 5.

13. A process for the preparation of a linear copolymer having the property of being redispersible in water to form an emulsion after the latex of said copolymer has been initially dried to a film, which process comprises copolymerizing a monomer mixture containing butyl acrylate, styrene, acrylonitrile, and from 1–15 mole percent, based on the total weight of monomers, of N-(allyloxymethylene)-methacrylamide, the copolymerization being conducted in aqueous emulsion at an acid pH of at least 3 in the presence of a nonionic emulsifier and a redox catalyst in an amount of from between 0.01 and 5% by weight, based on the total weight of monomers.

14. The process of claim 13 wherein the copolymer latex is formed into a film and permitted to stand for a time sufficient to form a self-cross-linked permanent film.

15. A process for the preparation of a novel film-forming copolymer latex which comprises copolymerizing butadiene, butyl acrylate, acrylonitrile, and from 1–15 mole percent, based on the total weight of monomers, of N-(allyloxymethylene)-acrylamide in an aqueous emulsion and in the presence of acrylic acid and a redox catalyst in an amount of from between 0.01 and 5% by weight, based on the total weight of monomers, and at a pH between 3 and 9 to form a linear copolymer of said monomers in the form of a stable latex.

16. The process of claim 15 wherein said latex is formed into a film by applying it to a support and letting it stand for a time sufficient to cross-link.

17. The process of claim 16 wherein the copolymer film is heated to about 130° C. to accelerate its cross-linking.

References Cited by the Examiner

UNITED STATES PATENTS

| 2,500,265 | 3/1950 | Walling et al. | 260—89.5 |
| 2,773,063 | 12/1956 | Specht et al. | 260—80 |
| 2,783,212 | 2/1957 | Schnell | 260—86.1 |
| 2,984,588 | 5/1961 | Graulick et al. | 117—161 |

FOREIGN PATENTS

| 482,897 | 4/1938 | Great Britain. |
| 786,381 | 11/1957 | Great Britain. |
| 835,588, | 5/1960 | Great Britain. |

OTHER REFERENCES

Stille, Introduction of Polymer Chemistry, John Wiley & Sons, Inc., New York (1962), pp. 60 and 61.

JOSEPH L. SCHOFER, *Primary Examiner.*

PHILIP E. MANGAN, DONALD E. CZAJA,
*Examiners.*

H. WONG, *Assistant Examiner.*